July 20, 1926.  
W. H. BARLING  
AIRCRAFT  
Filed Nov. 28, 1924
1,592,917
3 Sheets-Sheet 3
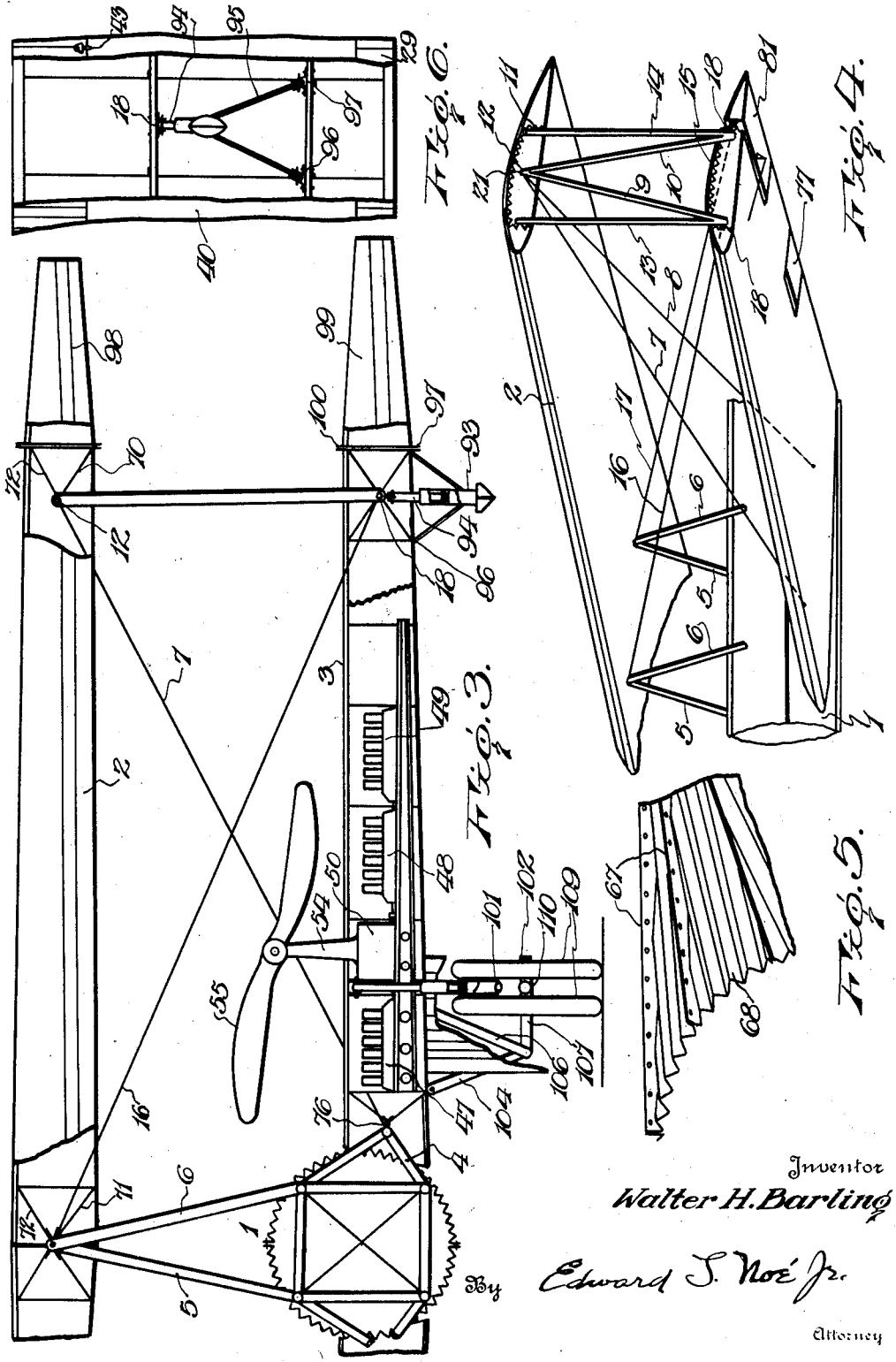

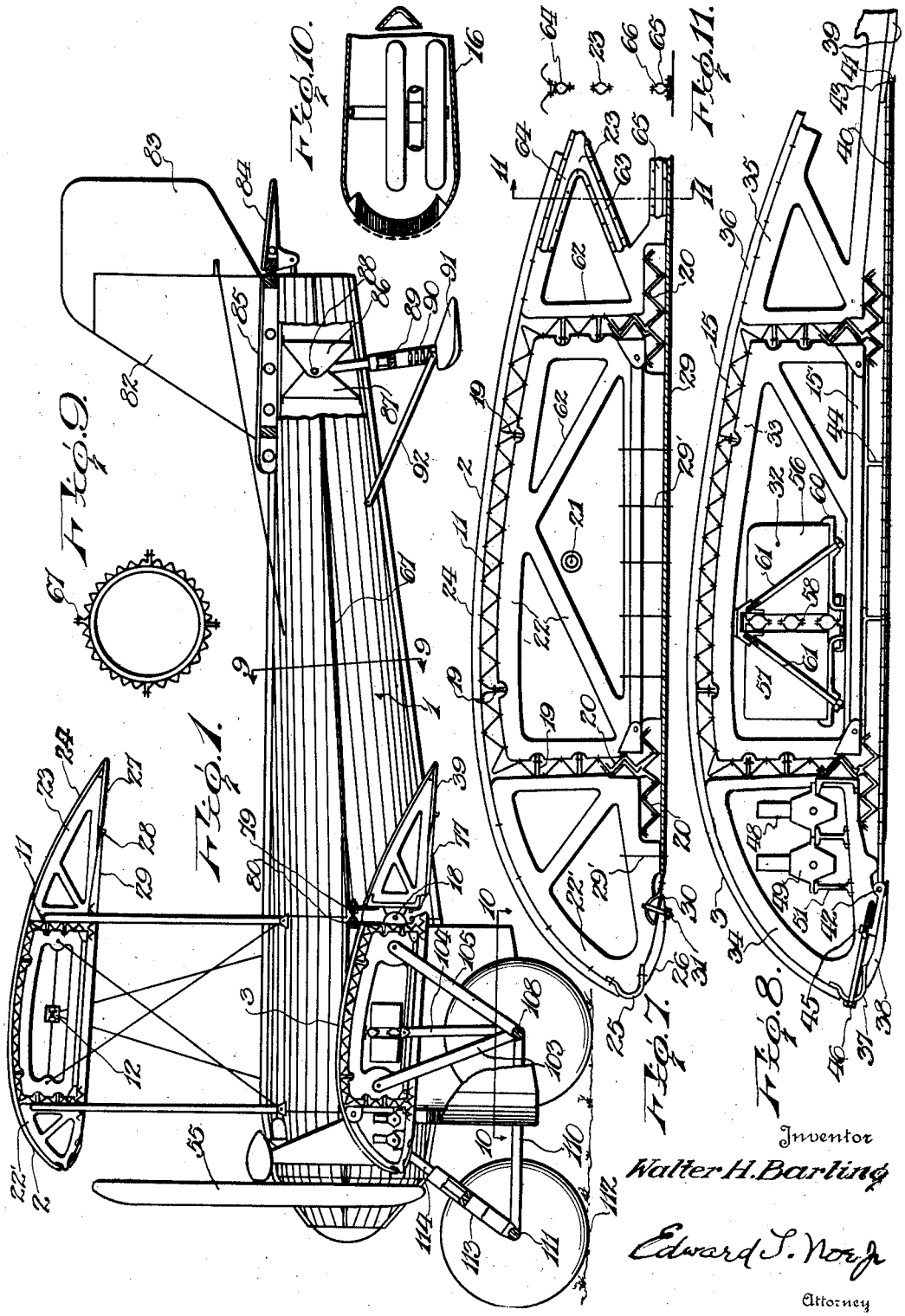

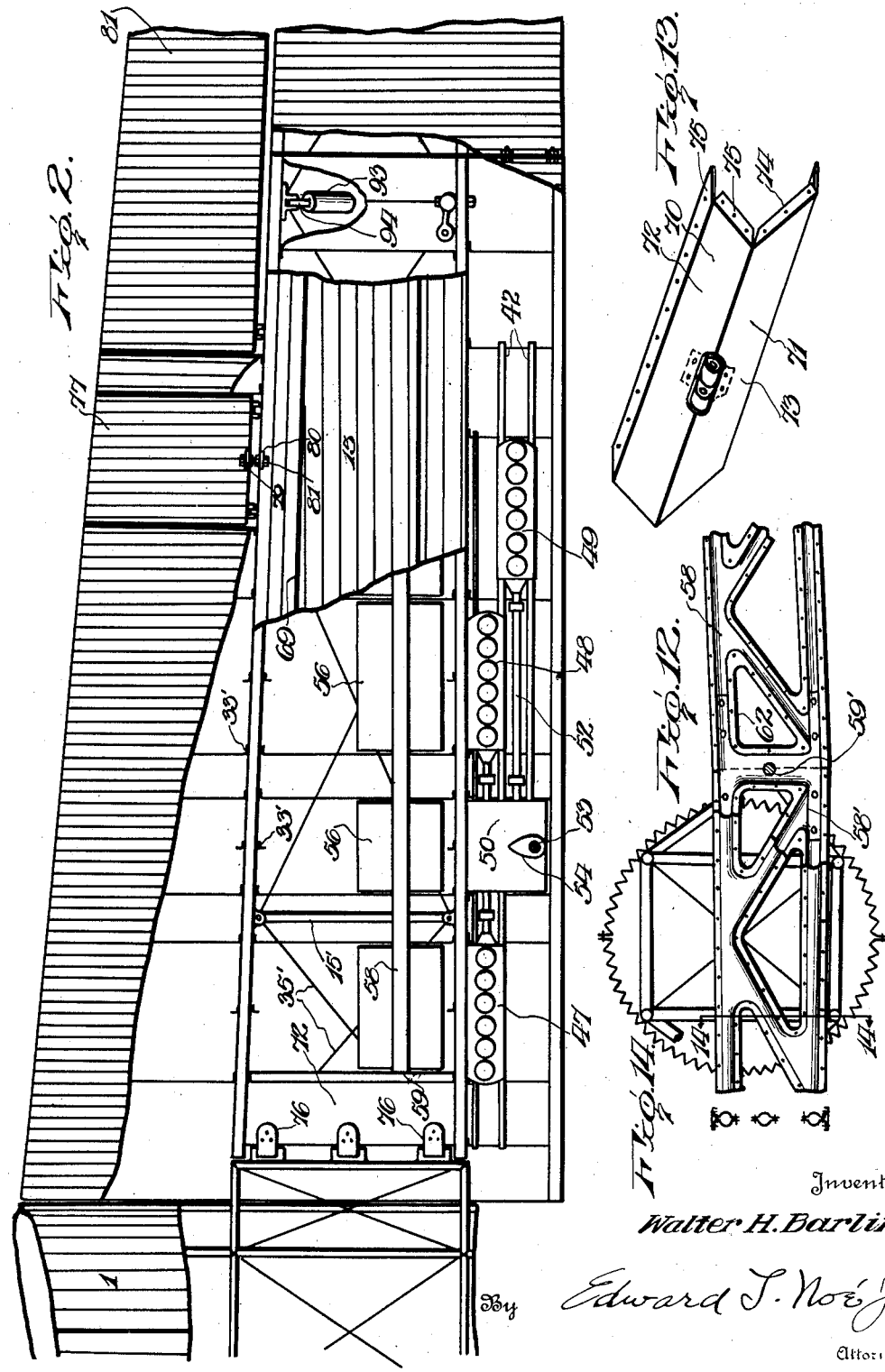

Patented July 20, 1926.

1,592,917

UNITED STATES PATENT OFFICE.

WALTER H. BARLING, OF DAYTON, OHIO.

AIRCRAFT.

Application filed November 28, 1924. Serial No. 752,688.

This invention relates to aircraft, more particularly of the giant airplane type and the primary object of the invention is to provide a structure of the semi-monocoque type, which will be strong while possessing a minimum weight.

On large aircraft in which the outer surface takes a substantial portion of the strain on the wing or fuselage, it is desirable to provide an internal main strength member, either of open or closed construction, located in the region of the average center of lift of the wing. The main strength member is made of a considerable width so as to take a major portion of the stresses on the wing or other aircraft part to which it may be applied, and the outer surface on the top side may extend over and to each side of the main strength member and be rigidly attached thereto.

The surfaces of aircraft parts, such as the fuselage and wings of an airplane and an envelope and nacelle of a lighter-than-air craft, which are more exposed to the action and deterioration of weather, such as the upper surfaces in the examples mentioned, are constructed of a material which is of a weather-resisting type, such as sheet metal, and the lower surfaces are then made of a material which can be easily replaced and removed for purposes of inspection or repair, since it is impractical to remove the sheet metal surfaces which are usually riveted to the main strength members. I preferably use fabric as the material from which the lower surfaces of the wing and fuselage are made, as that material is susceptible of easy application and of comparatively small cost.

The upper surfaces of the fuselage, wings and main strength members, are preferably constructed of corrugated sheet metal, with the corrugations extending substantially parallel to the line of flight. The sheet metal is applied in a number of sections which are joined together in a new manner at an angle to the line of the corrugations so as to provide additional strength.

The main strength member of the wing is made in the form of a hollow open section, with a main neutral axis, substantially intermediate of its ends, and external braces are applied to the wing so as to meet or intersect at the neutral axis, a distributor being used to transmit the forces from these braces to a comparatively large area on the main strength member. Such a distribution is necessary wherever a brace member of any sort is applied to a hollow open section, or wherever a main part of a wing is applied to a supporting structure, such as a fuselage.

Where the wing is of large size and of comparatively flimsy construction, the motors may be mounted within the front part of the wing in front of the main strength member and the longitudinal axes of the motors are then placed so as to be parallel to the long axis of the main strength member, or in other words transverse to the line of flight so that the motors may be readily accommodated within the wing without interfering with the main strength member. The radiator may be mounted below the wing so as to stream line the landing gear which is preferably braced to the wing below the motors. Such a location of the radiators relieves the wing of other weight since the landing gear may be braced directly to the fuselage as well as being supported by the wing.

In large aircraft of this type it may be found that after the craft has been built the attitude of the ship is not exactly correct in flight, one side of the craft may be heavier than the other or there may be variations in the fixed angle of incidence. It is therefore proposed to provide a small auxiliary surface having a variable angle of incidence which may be correctly set in fixed position so as to counter-balance any tendency of one side of the ship to ride higher than the other.

With the above and other more detailed objects in view, which will be more fully set forth in the attached description and in the drawings, a large aircraft in accordance with my invention, will be set forth.

In the drawings:—

Fig. 1 is a side elevation of the craft, showing the ends of the wings and other parts broken away for the purpose of illustration.

Fig. 2 is a plan view of a portion of a lower wing, showing most of the corrugated top covering removed.

Fig. 3 is a front elevation of one side of the craft, showing also portions broken away.

Fig. 4 is perspective view showing the method of bracing the wings.

Fig. 5 is a detail showing the method of joining the corrugated sheets forming the fuselage.

Fig. 6 is a bottom plan view of the portion of the lower wing showing the mounting of the wing skid.

Fig. 7 is a section of the upper wing taken parallel to the line of flight.

Fig. 8 is a section of the lower wing.

Fig. 9 is a transverse section of the fuselage taken on the line 9—9 of Fig. 1.

Fig. 10 is a horizontal section on the line 10—10 of Fig. 1 showing the radiator partly streamlining a portion of the landing gear.

Fig. 11 is a vertical section on the line 11—11 of Fig. 7, through one of the wing formers.

Fig. 12 is a partial transverse section through the fuselage and the lower wing taken substantially through the center of lift of the lower wing.

Fig. 13 is a detailed view of one of the distributors.

And Fig. 14 is a section on the line 14—14 of Fig. 12 through the beam 58.

Referring more particularly to the drawings by reference numerals, the fuselage 1 is provided with upper and lower sustaining surfaces 2 and 3 respectively, the lower wing 3 projecting from and attached to a stub brace portion 4, attached directly to the fuselage. Upper wing 2 is braced to the fuselage by means of struts 5 and 6 and guy wires 7 and 8. The upper and lower wings are braced together near their outer portions by means of a vertical truss of substantially a W formation, the inner legs 9 and 10 of which intersect at the neutral axis of the main strength member 11 of the upper wing at the point 12. The neutral axis of the main strength member is the line caused by the intersection of the vertical neutral plane and the horizontal neutral plane of the member. The outer legs of the W are the vertical struts 13 and 14 which are attached to the front and rear respectively of the main strength member 11 of the upper wing, and the main strength member 15 of the lower wing. Brace wires 7 and 8 also intersect at the point 12. Additional brace wires 16 and 17 are provided, which brace the junctions of the struts 5 and 6 to the points 18 where the struts 9 and 13 and the struts 10 and 14 intersect.

The upper and lower wings are each provided with a rigid main strength member extending longitudinally of the wing which is formed of corrugated sheet metal having an open hollow section of substantially flattened inverted U shape. The upper main strength member 11 is formed of a number of sheets of corrugated metal which are riveted together at the joints 19 in a manner which will be more fully described later. The lower downwardly projecting ends of the member are loaded by additional sheets of corrugated metal 20 which are riveted to the lower ends thereof so that the main neutral axis of the beam is located at the point 21 which is substantially at the geometric center of the member by reason of the loaded ends. The main strength member 11 is so located on the wing as to have its neutral axis 21 at substantially the location of the average center of lift of the wing. The lower ends of the legs of the inverted U at their loaded portions are preferably interconnected by means of forwardly and rearwardly extending compression members, and by additional diagonal tension members which form a horizontally extending truss at the lower portion of the strength member.

Within the main strength member are a series of formers 22 extending parallel to line of flight which may be added to further rigidify the member 11, and which are attached to the lower bulges of the corrugations of the member 11. Other formers 22′ and 23 are attached to the front and rear sides respectively of the member 11 to define the contour of the wing. Upon the formers 22′ and 23 and upon the upper surface of the strength member 11, is applied the upper wing surface 24 which is preferably constructed of a number of sheets of sheet metal which is corrugated transversely of the wing or in other words parallel to the line of flight. The upper surface 24 is permanently attached to the strength member by means of rivets or welding. A leading edge strip 25 is bolted or riveted to the forward end of the surface 24 and also bolted or riveted or otherwise attached to the lower rigid short strip of metal 26 extending longitudinally of the wing and below the forward portion thereof. A second longitudinal strip of metal 27 extends along the trailing edge and below the lower rear portion of the wing, and is attached at the trailing edge to the rear edge of the surface 24. These strips 26 and 27 may be either flat or corrugated as desired.

In order to provide for ease of inspection and for access to the interior of the wing for the purpose of repair, I provide the lower surface of the wing with a covering which is easily mounted and easily replaced. The upper portion of the wing is exposed to the action of the weather, especially as airplanes are often parked in the open without the use of a shelter of any sort, and it has been found desirable to use a permanently applied upper surface of such a weather resisting material as sheet metal. The lower replaceable surface is preferably made of fabric which is easily removed for inspection or repairs, and easily and cheaply replaced. The fabric being more or less shielded on the lower surface from the deteriorating effects of the action of the elements, will last as long as is necessary. A strip of fabric is first applied to a rigid member or holder 28, which may be in the form of a longitudinal holder of wood or a heavy wire. The fabric for the upper wing 29 is then attached to a forward holder of wood or metal 30, the parts 28 and 30 being disassembled at the time the fabric is applied to them. The rear longitudinal strip 28 is first applied to the forward portion of longitudinal strip 27 by hooks or in any other suitable manner and the forward strip 30 is then attached to the forward strip 26 by means of bolts or other adjustable fasteners 31, which are preferably made so that the strip 30 may be pulled forward to stretch the fabric. The fabric 29 is then sewed from the outside to the lower portions of the formers 22, 22′ and 23, after it has been placed in position by means of the cords 29′. The lower wing is constructed in a generally similar manner with the neutral axis of the lower main strength member 15 located at the point 32 substantially at the geometric center of the member and also at the location of the average center of lift of the wing. Formers 33 extending parallel to the line of flight, are mounted with and rigidify the main strength member 15, to which they are attached in permanent manner. The vertical sides of the main strength member 15 may be further rigidified by vertical angular strips 33′ attached thereto. Additional formers 34 and 35 are attached to the front and rear of member 15 to define the forward and rear parts of the wing contour. The lower loaded portions of the inverted U-shaped member 15 are tied together by a series of braces 15′, extending parallel to the line of flight and having additional tension wires 35′ which form, with the braces 15′ a horizontally extending truss. The upper wing covering 36, having corrugations extending parallel to the line of flight is applied in a permanent manner to the formers 34 and 35 and to the upper surface of the main strength member. A leading edge strip 37 with a lower metal forward surface 38 are attached to the front portion of the upper surface 36 and the lower rear metal surface 39 is attached to the rear portion of the upper surface 36. The lower fabric covering 40 is attached to the rear longitudinally extending wire 41 and to the forward longitudinally extending wire 42, which are interconnected by wire framework consisting of a series of parallel wires extending transversely of the holders and fixed thereto. After the fabric has been assembled on the elongated holder wires 41 and 42, the rear holder is applied to the series of hooks 43 which are attached to the rear edge of the strip 39. A series of fasteners 44 are fixed to the lower portions of the formers 33 and the transverse wire frame work may be applied to these fasteners which are provided with laterally extending hooked ends. It will be understood that the fabric is sewed to the wire frame work before it is applied to the wing. After the various fasteners 44 have been attached to the wire of the fabric, the forward longitudinal 42 which is provided with a series of fasteners 45 is applied in position and the fasteners 45 may be drawn forward to stretch the wires and the fabric by means of a series of bolts 46 extending through the strip 37.

Within the forward nose portion of the lower wing and in front of the forward end of the main strength member 15, is provided a series of motors or internal combustion engines, designated 47, 48 and 49, and a gear box 50 which are mounted on engine bearers 51 supported by the forward formers 34. The engines are mounted so that their longitudinal axes which correspond to the axes of the crank shafts are disposed longitudinally of the wing and transversely to the line of flight. With the engines disposed in this manner the weight of the engines are carried by a considerable portion of the forward part of the main strength member, since the load is not concentrated as much as where the engines are positioned in the customary manner. Each engine is provided with a driven shaft 52 extending to the gear box and the engines are adapted to be connected by means of the gear box to drive a vertical shaft 53 extending within the post 54, the upper end of which mounts a propeller 55.

Within the lower wings are mounted the gas tanks or other load carrying containers 56 and 57, which are attached in a releasable manner to the beam 58 which extends longitudinally of the wing within the formers 33 and within the main strength member 15. Beam 58 is attached directly to the formers 33 and extends continuously through the central portion of the wing and through the fuselage as shown at 58′ which is a continuation of beam 58, joined thereto in a detachable manner at the point 59′ as shown in Fig. 12. If desired it may be interrupted at the point 59. The tanks 56 and 57 are applied to the beam 58 by means of a rack arrangement 60 consisting of horizontally extending shelves which are braced in position to the upper portion of the beam by means of bolts 61 which may be removable, to permit the shelves to collapse for the removal of the tanks.

The beam 58 and also the formers 22, 22′, 23, 33, 34 and 35 are all preferably made of sheet metal and the construction of all of these members is shown in Figs. 11 and 14. These members are made in two vertical halves, each half comprising a single sheet of metal which is stamped with lightening holes 62 so as to provide diagonally extending braces 63 between the upper longitudinal 64 and the lower longitudinal 65, the diagonals being integral with the longitudinals. Both the diagonals and the longitudinals are bulged or stamped outwardly at their intermediate portions so as to provide closed hollow flanges 66 in both the longitudinals and the diagonals when the two halves are attached together by means of rivets or other suitable attaching devices. The bulges of the halves of the longitudinals are opposite to each other throughout their lengths and the same is true of the diagonals. In such a method of construction the parts are easily made and the finished whole is an exceedingly rigid truss element having exceedingly light weight.

The fuselage which is constructed of a series of sheets of sheet metal which are longitudinally corrugated, is shown in detail in Fig. 5. The taper of the fuselage causes some of the corrugations to intersect the line of the joint indicated at 67 at an angle as shown by the corrugations in the sheet 68. This joint 67 is made by bending the edges of the sheets at right angles, which is done by beating out the edges of the sheets to provide a substantially plane upturned portion which is attached to a corresponding mating portion upturned from an adjacent sheet. The sheet 68 may be held on a former so as to preserve the corrugations for substantially their full depth practically up to the line of the joint, while the edges are being mashed or beaten over. A similar joint is illustrated in Fig. 2 at 69 of the main longitudinal strength member 15 which is shown as having an outward taper so that the corrugations of the central strip forming the central upper portion of the member 15 intersect the joint 69 at an acute angle. If desired all of the joints of the various corrugated sheets used in the construction of the main strength members of the wing or of the surface covering, may be made in this manner to increase the rigidity of the construction.

As shown in Fig. 4, and also in Fig. 3, the brace members 9 and 10 and the wires 7 and 8 intersect at point 12, which is within the outline of the main strength member 11. In order to distribute the stresses transmitted by these braces to the main strength member, I provide a distributor shown in detail in Fig. 13 at 70. This distributor consists of a plurality of sides 71 and 72 which intersect along the line containing the point 12 where it is provided with an attachment fitting 73 to which the braces may be applied. Sides 71 and 72 are provided with end portions 74 and 75 respectively, which are attached to the main strength member at widely separated points by means of rivets or other suitable connections. The comparatively large area of the main strength member utilized as attaching point of the distributor results in a distribution of the stresses over a comparatively large portion of the stress member and makes the use of an exceedingly heavy girder unnecessary. A similar distributor is used to distribute the forces from the struts 5 and 6 where they intersect within the outlines of the girder at the inner portions of the upper wings. Likewise distributors are used at the point 76 to provide hinge pins at this point where the lower wing is removably attached to the stub brace portion 4, projecting from the fuselage. It is also desirable to use distributors of a similar character at point 18 on the lower wing in order to transmit the force of the brace wires 16 and 17 and struts 9, 10, 13 and 14, to a considerable part of the lower main strength member 15.

In large aircraft it is often found that after the craft has been built it tends to fly heavier on one side than on the other, due to some inaccuracies in assembling or construction, or due to an unbalanced distribution of the weight. In order to correct any such a matter, I provide a wing flap 77 of comparatively small extent which is hinged to the rear end of the main strength member 15 of the lower wing along the line 78, and which is provided with a lug 79 rigid therewith and extending upwardly from the upper forward portion of the wing flap, as shown in Fig. 1. A lug 80, rigid with the rear upper portion of the main strength member 15, is mounted adjacent to lug 79 and a bolt 81' provided with a suitable number of lock nuts provides for adjustable positioning of the wing flap so that it may be fixed in position, but immovable in flight. The wing flap is adapted to be adjusted through a small angle of incidence so as to neutralize the unbalanced effect and cause the craft to fly at the correct attitude. The ailerons 81 are mounted at the outer tips of the lower wings and are adapted to be controlled in the customary manner from the cockpit.

At the rear end of the fuselage 1 is provided the customary vertical fin 82, rudder 83, elevator 84 and stabilizing fin 85. The upper surfaces of the elevator and stabilizing fin are preferably constructed of sheet metal and the lower surfaces may be made of either sheet metal or of fabric. Within the rear portion of the fuselage are two conical distributors 86 and 87, which provide a common point 88 for the attachment of a fitting to which is attached a depending skid bar 88, the lower end of which is provided with a piston 89 mounted within a cylinder 90 pivotally attached to the skid 91. A forwardly extending V-shaped bar 92 pivotally connected to the lower end of cylinder 90 and the diverging legs are connected by transverse pivots at their forward ends at suitable points on the fuselage. The cylinder 90 is adapted to contain fluid such as a suitable oil and the piston 89 is provided with a by-pass to permit the flow of the fluid from one end to the other of the cylinder which is closed at its upper end by the skid bar 88. The use of a shock absorbing skid of this character is particularly desirable on a large aircraft or on aircraft of the semi-monocoque type as it is capable of absorbing the shock of landing without exerting any sudden strain on the aircraft parts to which it is applied. A similar skid is applied to the outer portion of each lower wing as indicated at 93, the V-shaped skid bar 95 of which is pivoted at its forward points 96 and 97 to the main strength member 15, so as to be movable about a transverse axis, and pivoted to the skid at the apex of the V. A rearwardly and upwardly extending strut 94 is pivoted to the skid and to point 18 at the rear part of the main strength member 15.

The wings are preferably provided with detachable wing tips 98 and 99, the wing tip of the lower plane being attached by bolts at the point 97 and also at the point 100 to the surfaces of the main wing portion. A main landing gear designated generally 101 may be applied below the wings and attached either directly to the wings or to the fuselage. As shown in Figs. 1 and 3 a rigid landing gear frame 102 is formed of the struts 103, 104 and 105 respectively, struts 103 and 105 being located in the same longitudinal plane and attached at their upper ends by means of distributors to the forward and rear ends of the main strength member 15. Strut 104 and auxiliary struts 106 and 107 brace the frame against any sidewise movement. Pivotally mounted at the point 108, corresponding to the axle of the two main wheels 109, is a longitudinal central brace 110 the forward end of which mounts an axle 111 in a pair of forward wheels 112. Axle 111 is attached by a cylinder 113 and a piston rod 114 is attached at its upper end to the forward part of the main strength member 15. A piston having a valve through its head is firmly attached to the lower end of rod 114 so as to be resisted in its movements by the oil within the cylinder. While in flight the lower wings 112 are at a much lower level than the wheels, 109, the piston on the piston rod 114 being at its upper limit of movement within the cylinder. The first shock of landing is entirely absorbed by the fluid in the cylinder 113, it being understood that all of the shock absorbers for both the main landing gear and the tail and wing skids are of the same type. The rigid structure 102 is partially stream lined by the radiator 115 which is crescent-shaped and positioned in front of this structure and supported therefrom and also from the main strength member 15 of the lower wing. A fairing 116 completes the stream lining of the rigid structure of the landing gear so as to reduce its wing resistance. With the radiator located in this manner, the landing gear is not only partially stream lined but the radiator is located at a point where it may be supported a short distance from the fuselage and mounted on a comparatively strong structure.

I am aware that various modifications may be made without departing from the spirit of my invention and I do not desire to be limited to the precise construction which has been shown for the purpose of illustrating one embodiment thereof, but intend that the invention be defined in the following claims.

I claim:—

1. In an aircraft, a substantially horizontal aerofoil having a sheet metal top surface and a lower fabric surface, means for detachably connecting said lower surface at the front and rear edges thereof, and additional means for attaching said lower surface at points removed from said front and rear edges.

2. In an aircraft, a member having a permanent rigid top surface and a spaced lower quickly replaceable surface made of a material having inferior weather resisting properties than said top surface, means for detachably connecting said lower surface at its ends and a series of additional attachments for said lower surface between its ends.

3. An aerial body having one portion more exposed to weather than a second portion, said one portion having a permanent outer covering, said second portion having an easily removable sheet of material different from the material of the said one portion and having inferior weather resisting properties than the material of said one portion, means for reinforcing one of the ends of said sheet and means for detachably connecting said reinforced end to said permanent outer covering.

4. In an aircraft, an aerofoil having a main hollow strength member having an open lower side, taking a major portion of the strain on the wing, a permanent upper surface attached to the upper part of said member and extending forwardly therefrom, and a lower quickly replaceable surface having inferior weather resisting qualities than said upper surface, and means for detachably connecting one end of said replaceable surface to said upper surface.

5. An aerial body having a rigid hollow open main strength member with an open lower side of substantially inverted flattened U shape, a truss interconnecting the lower ends of said member, and a quickly replaceable outer skin closing said open side, and means for detachably connecting said outer skin to permit its removal intact.

6. In an aircraft, an aerofoil having a rigid hollow open main strength member adapted to take a major portion of the stress on said aerofoil and having a lower open side, a leading edge and a trailing edge of said aerofoil spaced a substantial distance from said member and a sheet of material forming a substantial part of the lower surface of said aerofoil and positioned below said member to close the open side thereof, and means for quickly attaching and detaching said sheet of material in position.

7. In an aircraft, a wing having an open hollow main strength member of flattened inverted U section formed of sheet metal with a neutral axis in the region of the center of lift of the wing, a series of formers extending parallel to the line of flight and attached to said member, a sheet metal upper surface extending from said member forwardly to the leading edge of the wing, and a sheet of material forming a substantial portion of the lower surface of the wing and positioned below said member to extend the full width thereof and fasteners for quickly attaching and detaching said sheet of material in position.

8. In an aircraft, an aerofoil having a rigid hollow open main strength member extending longitudinally of the wing with the lower side open and having a neutral axis near the center of lift, and a sheet metal upper surface, and a fabric lower surface of said aerofoil attached thereto.

9. In an aerofoil, a rigid main strength member extending longitudinally of the aerofoil, of substantially inverted flattened U section and of comparatively large size to take a major portion of the forces on the aerofoil.

10. An aerofoil comprising a hollow rigid main strength member extending longitudinally of the aerofoil, and having its lower side open, a truss interbracing the lower ends of said member, a rigid upper surface extending forwardly from and attached to said member, and a lower removable surface below said member and closing the lower side thereof, and means for detachably connecting said removable surface to permit its removal intact.

11. An aerial sustaining surface comprising a rigid main strength member formed of thin sheet metal bent to form a hollow girder of comparatively large width as compared to height and of large size to take most of the strain on said surface, a lower fabric surface extending below said member and a permanent weather resisting front top surface, and means for detachably connecting said lower fabric surface to permit it to be readily removed intact.

12. In an aerofoil, a rigid hollow open main strength member of sheet metal, having its under side open and having its neutral axis sobstantially at its geometric center.

13. In an aerofoil, a rigid hollow open main strength member of thin corrugated sheet metal, having its under side open and having its neutral axis substantially at its geometric center, and a lower fabric surface extending across the width thereof.

14. In an aircraft structure, a longitudinal strength member longitudinally corrugated and having a substantially inverted flattened U section, with its neutral axis substantially at its geometric center, and an aerofoil surface extending forwardly from said member and attached directly thereto.

15. In an aircraft structure, a longitudinal strength member longitudinally corrugated and having a substantially inverted flattened U section, a lower aerofoil surface extending forwardly from the lower part of said member and a sheet metal top aerofoil surface extending over, forwardly and rearwardly from said member.

16. In an aero foil, a main hollow rigid strength member extending longitudinally thereof, formed of separate sheets of corrugated sheet metal joined together along a line extending angularly to the corrugations of one of said sheets, the corrugations of the said one of said sheets extending for their full depth substantially up to the joint.

17. In an aircraft, a structural body comprising separate sheets of corrugated sheet metal joined together along a line extending angularly to the corrugations of one of said sheets, the corrugations of the said one of said sheets extending for their full depth substantially up to the joint.

18. In an aircraft, a structural body comprising sheets of metal joined together, said sheets having bent up flat edges attached together to form the joint, one of said sheets being corrugated with the direction of the corrugations extending angularly towards the line of the joint.

19. In an aircraft, a main hollow strength member comprising corrugated sheets of metal joined together, said sheets having bent up flat edges attached together to form the joint, one of said sheets being corrugated with the direction of the corrugations extending angularly towards the line of the joint.

20. In an aerofoil, a main hollow strength member extending longitudinally thereof and substantially centrally disposed and having a neutral axis substantially at its geometric center, and a brace member for said aerofoil of substantial W shape with the inner legs of the W intersecting substantially at the neutral axis of the strength member.

21. In an aerofoil, a main longitudinal beam having a neutral axis disposed close to the average center of lift and between the upper and lower edges of the aerofoil, and a bracing therefor comprising a plurality of converging members intersecting substantially at the neutral axis of the beam, and an additional member attached to one side of said beam remote from said neutral axis.

22. In an aerofoil, a main longitudinal strength member and a brace therefor of substantial W shape with the inner legs of the W intersecting substantially at the neutral axis of the member.

23. In an aircraft, a plurality of superposed wings, a longitudinal main beam for each wing taking the major part of the forces on the wings, and a bracing for interconnecting said wings comprising a plurality of members intersecting substantially at the center of lift of one wing and near the neutral axis of one beam and attached at their other ends to points distant from the neutral axis of the other beam, and a plurality of additional members attached to points horizontally removed from the neutral axis of one beam and interconnecting the upper and lower wings.

24. In an aircraft, a sustaining plane having a large main rigid beam extending longitudinally of the plane, a rigid top covering for said plane extending forwardly and rearwardly from said beam, a lower fabric covering for said plane, a plurality of brace members intersecting near the center of lift of the surface and an additional brace member attached to the plane at a point distant from said center of lift, all of said brace members being attached at their other ends to aircraft parts external of the said sustaining plane.

25. In an aircraft, a sustaining plane having a large main rigid hollow beam extending longitudinally of the plane, a top covering for the plane extending forwardly and rearwardly of the beam, said beam having a neutral axis disposed approximately at the center of lift of the plane, brace members intersecting at a point substantially at the neutral axis of the beam, and a distributor to transmit the forces at said point to said beam, said distributor having a large area in contact with different parts of said beam.

26. In an aircraft, a hollow rigid beam and a distributor attached to said beam and providing a point of attachment near the neutral axis of the beam, and a structural member attached to said point.

27. In an aircraft, a hollow beam, and a distributor attached to said beam at a plurality of remote points, said distributor providing an anchorage for a brace member at a point within the outline of the beam.

28. In an aircraft, a hollow structural member, and a distributor attached thereto at a plurality of points to provide a fixed point as an anchorage.

29. In an aircraft, a hollow structural member, and a wedge shaped distributor attached thereto at a plurality of spaced points to provide a fixed point within the outline of the member, as an anchorage.

30. In an aircraft, a main strength member of substantially inverted U section, and a distributor attached to said member along parallel spaced lines to provide a point of attachment between the upper and lower edges of said member for a bracing.

31. In an aircraft, a wing having a main longitudinal rigid strength member, a series of internal combustion engines attached to said member, said engines having their longitudinal axes arranged parallel to the said strength member.

32. In an aircraft wing, a main longitudinal rigid hollow strength member of large size to take a major part of the forces on the wing and an internal combustion engine in front of said member with its main axis parallel to the main axis of the member.

33. In an aircraft, a transversely extending sustaining surface, a series of engines arranged therein with the main engine axes transverse to the line of flight.

34. In an aircraft, a transversely extending main sustaining surface, a main hollow beam extending transversely to the line of flight, a series of engines spaced laterally along said surface with the engine axes arranged transverse to the line of flight, a plurality of laterally extending engine bearers, and a series of spaced longitudinally extending members attaching said engine bearers to said beam.

35. In an aircraft, a wing having a main hollow strength member extending longitudinally thereof and having a neutral axis in the region of the average center of lift and of a large size to take a major portion of the forces on the wing, a series of engines arranged longitudinally of the wing, a landing gear below the wing and a radiator arranged below the wing to partly streamline the landing gear.

36. In an aircraft, a wing having a main strength member extending longitudinally of the wing, an engine mounted on the wing, and a radiator and landing gear frame below the wing and attached thereto, said radiator being formed as a hollow shell and partly streamlining the landing gear.

37. In an aircraft, a wing having a main strength member extending longitudinally thereof, a radiator below the wing, a rigid landing gear frame below the wing and braced thereto, said radiator partially streamlining said landing gear frame, a landing wheel movably supported forward of said landing gear frame and a fluid controlled plunger to control the movements of said wheel.

38. In an aircraft, in combination, a wing having a main strength member extending longitudinally of the wing, a series of motors arranged in said wing and braced to said member, said member having a substantially inverted flattened U shape, a series of formers extending transversely within said member and a beam supported by said formers within said member and extending parallel to said member, and means for bracing a load to said beam.

39. In an aircraft as set forth in claim 38 said formers and said beam being formed in two vertical integral halves joined together each half comprising a sheet of metal having an outwardly bulged top, an outwardly bulged bottom, and outwardly bulged ties interconnecting the top and bottom, said top, bottom and ties of one half being connected to the top, bottom and ties of the mating half on both sides of the bulges throughout the length of the bulge.

40. In an aircraft, a wing having a brace partly defining the wing contour, formed of halves joined together along a central plane, each half comprising a single sheet of metal having an outwardly bulged top, an outwardly bulged bottom, and outwardly bulged ties interconnecting the top and bottom, said top, bottom, and ties of one half being connected to the top, bottom and ties of the mating half on both sides of the bulges throughout the length of the bulge, the bulges of said top, bottom and ties mating together to form closed elongated hollow flanges.

41. In an aircraft, a truss element formed of halves joined together along a central plane, each half comprising a sheet of metal having an outwardly bulged top, an outwardly bulged bottom, and outwardly bulged ties interconnecting the top and bottom, said top, bottom and ties of one half being connected to the top, bottom and ties of the mating half on both sides of the bulges throughout the length of the bulge, the bulges of said top, bottom and ties mating together to form closed elongated hollow flanges.

42. In an aircraft, a sustaining surface having a main longitudinal hollow strength member having its neutral axis substantially at the center of lift of the surface, a longitudinal vertical beam within said member, and formers within said member defining the outline of the member and forming a mounting for said beam.

43. In an aircraft, a sustaining surface having a main longitudinal hollow sheet metal strength member, having its neutral axis substantially at the center of lift of the surface, a longitudinal vertical beam within said member, and formers within said member defining the outline of the member and forming a mounting for said beam, and a concentrated load applied on said beam.

44. In an aircraft, a sustaining surface having a main longitudinal hollow strength member having its neutral axis substantially at the center of lift of the surface, a longitudinal vertical beam within said member, and formers within said member defining the outline of the member and forming a mounting for said beam, said beam being extended to interconnect the sustaining surfaces on opposite sides of the aircraft.

45. In an aircraft, a sustaining surface having a main longitudinal hollow strength member having its neutral axis substantially at the center of lift of the surface, a longitudinal vertical beam within said member, and formers within said member defining the outline of the member and forming a mounting for said beam, and a series of engines arranged along the surface with their axes arranged longitudinally of said surface.

46. In an aircraft, a wing having a main hollow strength member extending longitudinally therein of large size to take a major portion of the stress on said wing, and a wing skid attached to said wing near its outer end, said skid comprising a skid bar pivoted to said wing at a point adjacent the forward portion of said member, and a fluid controlled skid on said bar.

47. In an aircraft, a main hollow strength member of comparatively large size, a movable skid attached thereto and comprising a rigid downwardly and rearwardly extending skid bar pivoted to said member on a transverse axis, and a fluid controlled skid attached to said bar.

48. In an aircraft, a main hollow strength member of comparatively large size, a movable skid attached thereto and comprising a rigid downwardly and rearwardly extending skid bar pivoted to said member on a transverse axis, a fluid controlled skid attached to said bar, said bar being of V-shape and pivotally attached to the skid at the apex of the V.

49. In an aircraft, a wing having a main hollow strength member extending longitudinally therein of large size to take a major portion of the stress on said wing, a rigid permanent upper surface attached to said member and extending forwardly and rearwardly therefrom, and a wing skid attached to said wing near its outer end, said skid comprising a skid bar pivoted to said wing at a point adjacent the forward portion of said member, a fluid controlled skid movably mounted on said bar, said upper surface being formed of corrugated sheet metal, and a lower quickly removable wing surface below said member.

50. In an aircraft, a fuselage, a wing having a rigid hollow main strength member extending longitudinally thereof, said member being of large size to take a major portion of the stress on the wing, and having a neutral axis between the upper and lower surface of the wing and in the region of the center of lift of the wing, upper and lower wing surfaces extending forwardly and rearwardly from said member, a wedge shaped distributor extending across a major portion of said member attached to said member at a plurality of distantly spaced points, and a series of connections on the point of said wedge for attaching said wing to a part connected to the fuselage to provide a joint for the assembly and disassembly of said wing.

51. In an aircraft, a sustaining surface having a main longitudinal hollow strength member of large size to take a major portion of the stress on the surface, a wing flap hinged to the said strength member, and means for moving said flap through small angles to permanently adjust the lateral balance of the aircraft, and means located adjacent to said flap to lock the flap in fixed position.

52. In an aircraft, a sustaining surface having a main rigid hollow sheet metal strength member extending longitudinally of the surface and open at its lower part, a sheet metal top surface extending forwardly and rearwardly from said member and a removable lower fabric surface below said member and means for attaching said fabric surface comprising an elongated holder, means for detachably connecting said holder to said sustaining surface, a second holder opposite to said first holder and attached to said fabric surface, means for detachably connecting said second holder to said sustaining surface to stretch the fabric between said holders, and means for connecting said fabric to the structure of the sustaining surface between said holders at a plurality of points.

53. In an aerofoil, a strength member extending longitudinally thereof, a fabric lower surface for said aerofoil below said member, and means for attaching said lower surface to said aerofoil comprising an elongated holder of a material having greater rigidity than the fabric and attached to the fabric throughout its length, a second elongated holder attached to the fabric opposite to the first said holder, and means for detachably connected said holders to a front and a rear portion of said aerofoil.

54. In an aircraft, a body having a strength member extending longitudinally thereof, a fabric lower surface for said body below said member, and means for connecting said fabric to said body comprising a plurality of rigid longitudinal holders attached to the fabric throughout their lengths, a series of wires connecting said holders, and means for detachably connecting said holders to opposite portions of said body.

55. In an aircraft, a body having a strength member extending longitudinally thereof, a fabric lower surface for said body below said member, and means for connecting said fabric to said body comprising a plurality of rigid longitudinal holders attached to the fabric throughout their lengths, and means for detachably connecting said holders to opposite portions of said body.

56. In an aerofoil, spaced upper and lower surfaces therefor, said lower surface comprising a section of material, front and rear longitudinals extending transversely to the line of flight and attached to opposite ends of said section of material, and means for attaching said longitudinals to the aerofoil structure to apply the section of material thereto in a replaceable manner, and means for pulling on one of said longitudinals to stretch the section of material under tension.

57. In an aerofoil, spaced upper and lower surfaces therefor, said lower surface comprising a section of material, front and rear longitudinals extending transversely to the line of flight and attached to opposite ends of said section of material, a series of tension members interconnecting said longitudinals and attached to said section of material between said longitudinals, means for attaching said longitudinals to the aerofoil structure and means for fastening said tension members to the aerofoil structure.

58. In an aerofoil, spaced upper and lower surfaces therefor, said lower surface comprising a section of flexible material, front and rear longitudinals extending transversely to the line of flight and attached to opposite ends of said section of material, a series of tension members interconnecting said longitudinals and attached to said section of material between said longitudinals, hook means for attaching said longitudinals to the aerofoil structure, and means for bodily moving one of said longitudinals for the purpose described.

59. An aerofoil having a permanent weather resisting top surface and a quickly replaceable lower surface spaced therefrom, said lower surface having opposite rigid end portions, and means for removably fastening the rigid end portions of said lower surface to the aerofoil.

60. An aerofoil having a permanent rigid weather resisting top surface and a quickly replaceable lower surface spaced therefrom, and made from different material than said top surface, said lower surface having front and rear rigid end portions, means for removably fastening the front end portion of said lower surface to the aerofoil at a point rearwardly removed from the leading edge thereof, and means for removably fastening the rear rigid end portion of said lower surface to the aerofoil at a point forward of the trailing edge thereof.

61. In an aircraft, a member having a permanent rigid top surface and a spaced lower quickly replaceable surface made of a material having superior attaching and replacing qualities than said top surface, said replaceable surface having opposite rigid end portions, means for removably fastening the rigid end portions to opposite parts of said member, and a series of additional attaching means provided on said replaceable surface intermediate the rigid end portions.

62. An aerial body having one portion more exposed to weather than a second portion, said one portion having a permanent outer covering of a material having great weather resisting properties, said second portion being of a material different from the material of the said one portion and having inferior weather resisting properties than the material of said one portion, rigidifying reinforcing means along one end of said second portion and means for quickly attaching and detaching said reinforcing means to said permanent outer covering.

In testimony whereof I have hereunto set my hand this 25th day of November, 1924.

WALTER H. BARLING.